(12) United States Patent
Zhou

(10) Patent No.: US 10,905,533 B2
(45) Date of Patent: Feb. 2, 2021

(54) ORAL-CARE SPUTUM SUCTION TUBE

(71) Applicant: Xing Zhou, Guangzhou (CN)

(72) Inventor: Xing Zhou, Guangzhou (CN)

(*) Notice: Subject to any disclaimer, the term of this patent is extended or adjusted under 35 U.S.C. 154(b) by 54 days.

(21) Appl. No.: 16/151,207

(22) Filed: Oct. 3, 2018

(65) Prior Publication Data

US 2019/0029787 A1 Jan. 31, 2019

Related U.S. Application Data

(63) Continuation of application No. PCT/CN2017/080121, filed on Apr. 11, 2017.

(51) Int. Cl.
*A61C 17/02* (2006.01)
*A46B 9/04* (2006.01)
(Continued)

(52) U.S. Cl.
CPC .......... *A61C 17/0208* (2013.01); *A46B 9/04* (2013.01); *A46B 11/063* (2013.01); *A46B 5/0095* (2013.01); *A46B 2200/1066* (2013.01)

(58) Field of Classification Search
CPC .......... A61M 1/0045; A61C 17/0208; A61C 17/043; A46B 9/04; A46B 11/063; A46B 5/0095; A46B 2200/1066
See application file for complete search history.

(56) References Cited

U.S. PATENT DOCUMENTS

| 4,435,170 A | * | 3/1984 | Laszczower | ........ A61M 1/0001 |
| | | | | 604/6.15 |
| 4,662,871 A | * | 5/1987 | Rafelson | ............. A61M 1/0023 |
| | | | | 600/104 |

(Continued)

FOREIGN PATENT DOCUMENTS

| CN | 2543522 Y | 4/2003 |
| CN | 202236560 U | 5/2012 |

(Continued)

OTHER PUBLICATIONS

Zhou, Extended European Search Report, EP17785364.5, dated Sep. 4, 2019, 7 pgs.

(Continued)

*Primary Examiner* — Ralph A Lewis
(74) *Attorney, Agent, or Firm* — Morgan, Lewis & Bockius LLP

(57) ABSTRACT

Disclosed is an oral-care sputum suction tube, including a housing, a water suction tube, a water intake tube, a toothbrush head, and a switch capable of controlling the flow of the water suction tube. A water suction opening provided on the toothbrush head is corresponding to a water suction opening provided on the housing, and a water intake opening provided on the toothbrush head is corresponding to a water intake opening provided on the housing. The switch is mounted in a switch mounting groove provided on a handheld portion of the housing. The switch includes a rolling wheel and a slope plate. The rolling wheel is mounted in the switch mounting groove, and the water suction tube is mounted between the rolling wheel and the slope plate. Because the water suction tube and the water intake tube are separated, sucked sputum flows away through a sealed passage, thereby avoiding cross-infection.

10 Claims, 3 Drawing Sheets

(51) Int. Cl.
*A46B 11/06* (2006.01)
*A46B 5/00* (2006.01)

(56) References Cited

U.S. PATENT DOCUMENTS

| | | | | |
|---|---|---|---|---|
| 4,963,046 A | * | 10/1990 | Eguchi | A46B 9/04 15/167.1 |
| 5,458,563 A | * | 10/1995 | Stewart | A61G 15/16 601/162 |
| 5,463,792 A | | 11/1995 | Hogan et al. | |
| 5,636,987 A | * | 6/1997 | Serfaty | A61C 17/028 433/80 |
| 6,217,328 B1 | * | 4/2001 | Oliver | A61C 1/0084 433/29 |
| 6,315,556 B1 | * | 11/2001 | Stewart | A46B 11/063 433/80 |
| 7,806,689 B2 | * | 10/2010 | Lee | A46B 11/0041 433/82 |
| 2003/0186192 A1 | * | 10/2003 | Ito | A46B 11/063 433/91 |
| 2011/0159456 A1 | * | 6/2011 | Cuevas | A61C 17/04 433/91 |
| 2014/0066893 A1 | * | 3/2014 | Valentini | A61M 39/286 604/506 |

FOREIGN PATENT DOCUMENTS

| | | |
|---|---|---|
| CN | 202311929 U | 7/2012 |
| CN | 203736337 U | 7/2014 |
| CN | 205094656 U | 3/2016 |
| CN | 205698658 U | 11/2016 |
| JP | H09308641 A | 12/1997 |
| KR | 20050022844 A * | 3/2005 |

OTHER PUBLICATIONS

Zhou, International Search Report and Written Opinion, PCT/CN2017/080121, dated Jul. 11, 2017, 18 pgs.

Zhou, International Preliminary Report on Patentability, PCT/CN2017/080121, dated Oct. 23, 2018, 7 pgs.

* cited by examiner

ORAL-CARE SPUTUM SUCTION TUBE

CROSS-REFERENCE TO RELATED APPLICATIONS

The application is a continuation application of PCT/CN2017/080121, entitled "SPUTUM SUCTION TUBE FOR ORAL CARE" filed on Apr. 11, 2017, which claims priority to Chinese Patent Application No. 201610240975.0, filed with the State Intellectual Property Office of the People's Republic of China on Apr. 17, 2016, and entitled "SPUTUM SUCTION TUBE FOR ORAL CARE", all of which are incorporated herein by reference in their entirety.

TECHNICAL FIELD

The present disclosure relates to a medical instrument for oral care, and more particularly to a sputum suction tube for cleaning an oral cavity and sucking out oral sputum.

BACKGROUND

Oral hygiene is directly associated with the lung infection of a patient. Critically ill patients in an ICU or stroke patients need to clean oral cavities at least twice a day, so as to be capable of maintaining effective oral hygiene and preventing lung infection. Two people are needed to cooperatively operate an oral-care toothbrush and sputum suction tube in the prior art. That is, one nurse uses a syringe to inject water while the other nurse brushes teeth and sucks sputum, so it is inconvenient for operation. In addition, when sputum is sucked out, the sputum of the patient will contaminate gloves of the nurse, so it is possible for cross-infection. Therefore, it is necessary to further improve and prefect instruments in the prior art.

SUMMARY

An oral-care sputum suction tube is provided. The oral-care sputum suction tube 100 is characterized by including a housing 1, a water suction tube 2, a water intake tube 3, a toothbrush head 4, and a switch 5 capable of controlling the flow of the water suction tube.

A. The water suction tube 2 and the water intake tube 3 are mounted in the housing 1, the toothbrush head 4 is mounted at the distal end of the housing 1, and the switch 5 is mounted in a switch mounting groove 1-5 provided on a hand-held portion of the housing 1.

B. The distal end of the water suction tube 2 is connected to a water suction tube distal-end inner port 1-2 provided at the distal end of the housing 1, and the distal end of the water intake tube 3 is connected to a water intake tube distal-end inner port 1-6 provided at the distal end of the housing 1.

C. A water suction opening 4-1 provided on the toothbrush head 4 is corresponding to a water suction opening 1-10 provided on the housing 1, and a water intake opening 4-2 provided on the toothbrush head 4 is corresponding to a water intake opening 1-9 provided on the housing 1.

The water suction tube 2 is made of a medical elastic material.

The switch 5 includes a rolling wheel 5-1 and a slope plate 5-2. The rolling wheel 5-1 is mounted in the switch mounting groove 1-5, and the water suction tube 2 is mounted between the rolling wheel 5-1 and the slope plate 5-2. When the rolling wheel 5-1 is driven forward, a gap between the rolling wheel 5-1 and the slope plate 5-2 becomes smaller and smaller, the rolling wheel 5-1 presses the water suction tube 2 to make the cross-sectional area of the water suction tube 2 smaller and smaller, and the flow of the water suction tube 2 decreases until it is completely closed. When the rolling wheel 5-1 is driven backward, the gap between the rolling wheel 5-1 and the slope plate 5-2 becomes larger and larger, the water suction tube 2 pressed by the rolling wheel 5-1 is loosened, the cross-sectional area of the water suction tube 2 becomes larger and larger under the action of an elastic restoring force of the water suction tube 2, and the flow of the water suction tube 2 increases until it is fully opened.

The toothbrush head 4 is made of a medical elastic material. The medical elastic material for manufacturing the toothbrush head 4 includes, but is not limited to, medical silicone, medical polyurethane (PU), medical polyethylene (PE), and the like.

The toothbrush head 4 includes at least one water suction opening 4-1 and one water intake opening 4-2. Usually, one water suction opening 4-1 is provided at the front end of the toothbrush head 4, and another water suction opening 4-1 is provided at the back of the toothbrush head 4. The water intake opening 4-2 is usually provided on the front surface of the toothbrush head 4, namely a surface where long bristles 4-3 are located.

The distal end of the water suction tube 2 is connected to the water suction tube distal-end inner port 1-2 of the housing 1, and the proximal end of the water suction tube 2 is connected to a water suction tube proximal-end inner port 1-3 of the housing 1. The distal end of the water intake tube 3 is connected to the water intake tube distal-end inner port 1-6 of the housing 1, and the proximal end of the water intake tube 3 is connected to a water intake tube proximal-end inner port 1-7 of the housing 1.

An upper cover 1-1 is provided on the housing 1. During assembly, the distal end of the water intake tube 3 is connected to the water intake tube distal-end inner port 1-6 of the housing 1, and is adhesively fixed with an adhesive; and the proximal end of the water intake tube 3 is connected to the water intake tube proximal-end inner port 1-7 of the housing 1, and is adhesively fixed with an adhesive. The distal end of the water suction tube 2 is connected to the water suction tube distal-end inner port 1-2 of the housing 1, and is adhesively fixed with an adhesive; and the proximal end of the water suction tube 2 is connected to the water suction tube proximal-end inner port 1-3 of the housing 1, and is adhesively fixed with an adhesive. The water suction tube 2 is disposed above the slope plate 5-2, the rolling wheel 5-1 of the switch 5 is mounted in the switch mounting groove 1-5 of the housing 1 and disposed above the water suction tube 2 to ensure that the water suction tube 2 is disposed between the rolling wheel 5-1 and the slope plate 5-2, and finally, the upper cover 1-1 is mounted on the housing 1, so as to complete assembly.

The proximal end of the water intake tube 3 is provided with a needle 3-1 capable of being connected to an infusion bag/bottle.

The needle 3-1 is provided with a detachable protective sleeve 3-1-1.

A flow control switch 3-2 is provided on the water intake tube 3.

The oral-care sputum suction tube 100 of the present disclosure includes a housing 1, a water suction tube 2, a water intake tube 3, a toothbrush head 4, and a switch 5 capable of controlling the flow of the water suction tube. The water suction tube 2 and the water intake tube 3 are mounted in the housing 1. The toothbrush head 4 is mounted at the distal end of the housing 1. The distal end of the water suction tube 2 is connected to a water suction tube distal-end inner port 1-2 provided at the distal end of the housing 1. The distal end of the water intake tube 3 is connected to a water intake tube distal-end inner port 1-6 provided at the distal end of the housing 1. A water suction opening 4-1 provided on the toothbrush head 4 is corresponding to a water suction opening 1-10 provided on the housing 1, and a water intake opening 4-2 provided on the toothbrush head 4 is corresponding to a water intake opening 1-9 provided on the housing 1. The switch 5 is mounted in a switch mounting groove 1-5 provided on a hand-held portion of the housing 1. The switch 5 includes a rolling wheel 5-1 and a slope plate 5-2. The rolling wheel 5-1 is mounted in the switch mounting groove 1-5, and the water suction tube 2 is mounted between the rolling wheel 5-1 and the slope plate 5-2. Because the water suction tube 2 and the water intake tube 3 are respectively closed and independent and are not in contact with the outside, sucked sputum flows away through a sealed passage, thereby avoiding cross-infection. A rolling-wheel-type switch structure allows the oral-care sputum suction tube 100 of the present disclosure to be normally in a suction-out state, and undesired choke when an oral cavity is cleaned is effectively avoided, thereby providing higher safety during oral care.

BRIEF DESCRIPTION OF THE DRAWINGS

FIG. 1-1 is an exploded view of FIG. 1.
FIG. 2-1 is a schematic structural diagram of an opened switch of an oral-care sputum suction tube of the present disclosure.
FIG. 3-1 is a schematic structural diagram of an oral-care sputum suction tube with a needle sleeve and a flow switch in a water intake tube of the present disclosure.

In the above drawings:
1. housing, 2. water suction tube, 3. water intake tube, 4. toothbrush head, 5. water suction tube switch.
1-1. upper cover of the housing, 1-2. water suction tube distal-end inner port on the housing, 1-3. water suction tube proximal-end inner port on the housing, 1-4. water suction tube port on the housing, 1-5. switch mounting groove on the housing, 1-6. water intake tube distal-end inner port on the housing, 1-7. water intake tube proximal-end inner port on the housing, 1-8. water intake tube outer port on the housing, 1-9. water intake opening on the housing, 1-10. water suction opening on the housing.
3-1. needle on the water intake tube, 3-1-1. protective sleeve on the needle, 3-2. flow switch on the water intake tube.
4-1. water suction opening on the toothbrush head, 4-2. water intake opening on the toothbrush head, 4-3. bristle on the toothbrush head.
5-1. rolling wheel of the water suction tube switch, 5-2. slope plate of the water suction tube switch.

DESCRIPTION OF EMBODIMENTS

Embodiment 1: Oral-Care Sputum Suction Tube of the Present Disclosure

Figure 1:
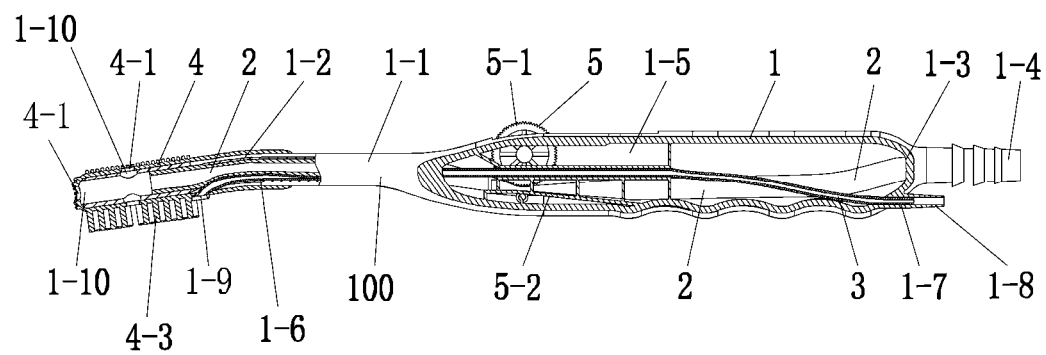
FIG. 1 is a schematic structural diagram of an oral-care sputum suction tube of the present disclosure.
Figure 1:
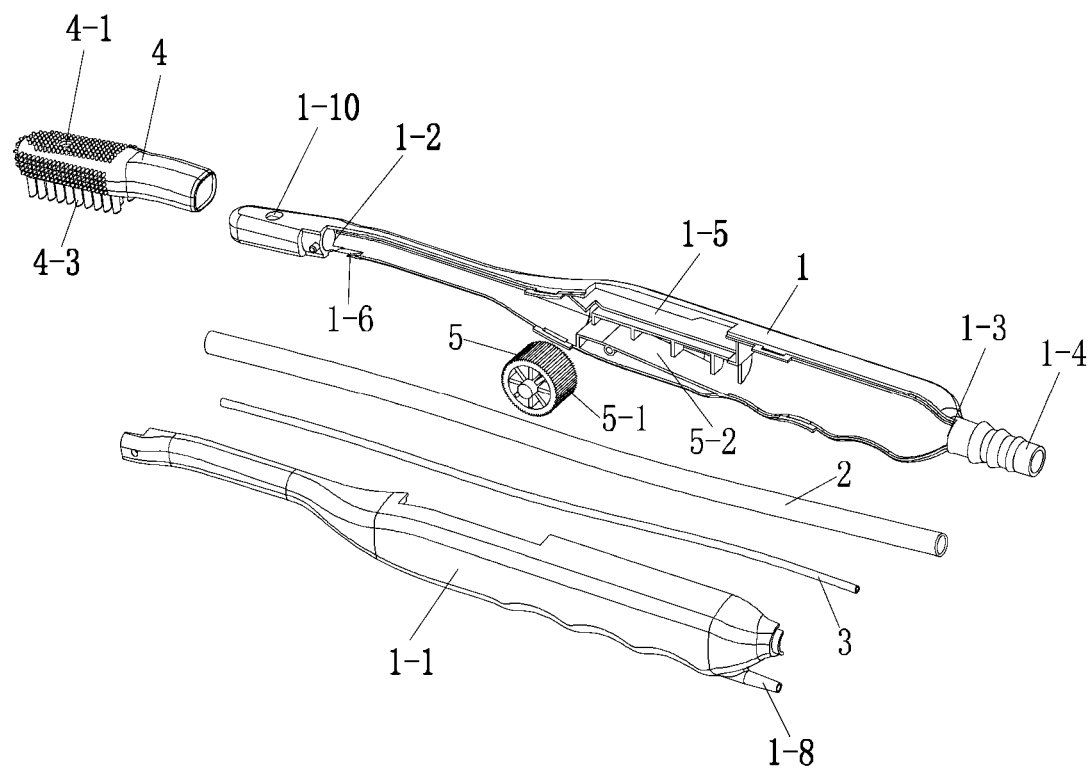
Figure 2:
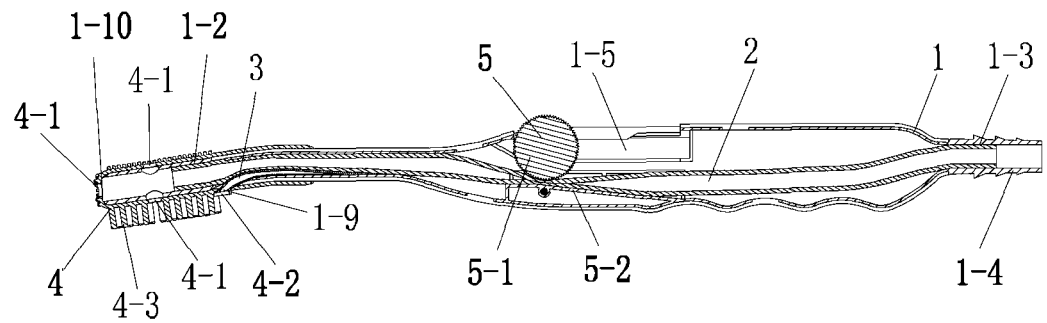
FIG. 2 is a schematic structural diagram of a closed switch of an oral-care sputum suction tube of the present disclosure.
Figures 1, 2:
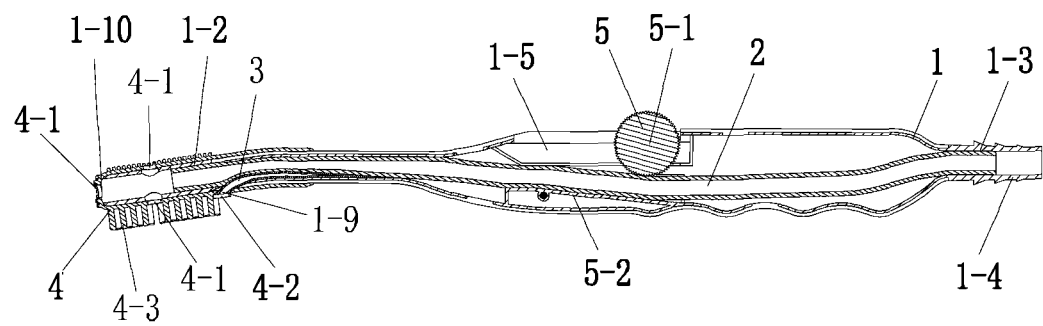

Referring to FIG. 1 to FIG. 2-1, in the present embodiment, the oral-care sputum suction tube 100 includes a housing 1, a water suction tube 2, a water intake tube 3, a toothbrush head 4, and a switch 5 capable of controlling the flow of the water suction tube. The water suction tube 2 and the water intake tube 3 are mounted in the housing 1. The toothbrush head 4 is mounted at the distal end of the housing 1. The distal end of the water suction tube 2 is connected to a water suction tube distal-end inner port 1-2 provided at the distal end of the housing 1. The distal end of the water intake tube 3 is connected to a water intake tube distal-end inner port 1-6 provided at the distal end of the housing 1. A water suction opening 4-1 provided on the toothbrush head 4 is corresponding to a water suction opening 1-10 provided on the housing 1, and a water intake opening 4-2 provided on the toothbrush head 4 is corresponding to a water intake opening 1-9 provided on the housing 1. The switch 5 is mounted in a switch mounting groove 1-5 provided on a hand-held portion of the housing 1. The switch 5 includes a rolling wheel 5-1 and a slope plate 5-2. The rolling wheel 5-1 is mounted in the switch mounting groove 1-5, and the water suction tube 2 is mounted between the rolling wheel 5-1 and the slope plate 5-2. When the rolling wheel 5-1 is driven forward, a gap between the rolling wheel 5-1 and the slope plate 5-2 becomes smaller and smaller, the rolling wheel 5-1 presses the water suction tube 2 to make the cross-sectional area of the water suction tube 2 smaller and smaller, and the flow of the water suction tube 2 decreases until it is completely closed. When the rolling wheel 5-1 is driven backward, the gap between the rolling wheel 5-1 and the slope plate 5-2 becomes larger and larger, the water suction tube 2 pressed by the rolling wheel 5-1 is loosened, the cross-sectional area of the water suction tube 2 becomes larger and larger under the action of an elastic restoring force of the water suction tube 2, and the flow of the water suction tube 2 increases until it is fully opened.

The water suction tube 2 is made of a medical elastic material.

The toothbrush head 4 is made of a medical elastic material. The medical elastic material for manufacturing the toothbrush head 4 includes, but is not limited to, medical silicone, medical polyurethane (PU), medical polyethylene (PE), and the like.

The toothbrush head 4 includes at least one water suction opening 4-1 and one water intake opening 4-2. Usually, one water suction opening 4-1 is provided at the front end of the toothbrush head 4, and another water suction opening 4-1 is provided at the back of the toothbrush head 4. The water intake opening 4-2 is usually provided on the front surface of the toothbrush head 4, namely a surface where long bristles 4-3 are located.

The distal end of the water suction tube 2 is connected to the water suction tube distal-end inner port 1-2 of the housing 1, and the proximal end of the water suction tube 2 is connected to a water suction tube proximal-end inner port 1-3 of the housing 1. The distal end of the water intake tube 3 is connected to the water intake tube distal-end inner port 1-6 of the housing 1, and the proximal end of the water intake tube 3 is connected to a water intake tube proximal-end inner port 1-7 of the housing 1.

An upper cover 1-1 is provided on the housing 1. During assembly, the distal end of the water intake tube 3 is connected to the water intake tube distal-end inner port 1-6 of the housing 1, and is adhesively fixed with an adhesive; and the proximal end of the water intake tube 3 is connected to the water intake tube proximal-end inner port 1-7 of the housing 1, and is adhesively fixed with an adhesive. The distal end of the water suction tube 2 is connected to the water suction tube distal-end inner port 1-2 of the housing 1, and is adhesively fixed with an adhesive; and the proximal end of the water suction tube 2 is connected to the water suction tube proximal-end inner port 1-3 of the housing 1, and is adhesively fixed with an adhesive. The water suction tube 2 is disposed above the slope plate 5-2, the rolling wheel 5-1 of the switch 5 is mounted in the switch mounting groove 1-5 of the housing 1 and disposed above the water suction tube 2 to ensure that the water suction tube 2 is disposed between the rolling wheel 5-1 and the slope plate 5-2, and finally, the upper cover 1-1 is mounted on the housing 1, so as to complete assembly.

In clinical use, a negative pressure tube of a hospital is first connected to the water suction tube port 1-4 on the housing 1 of the oral-care sputum suction tube 100 of the present disclosure. When the rolling wheel 5-1 is driven forward, a gap between the rolling wheel 5-1 and the slope plate 5-2 becomes smaller and smaller, the rolling wheel 5-1 presses the water suction tube 2, and the flow of the water suction tube 2 decreases until it is completely closed. When the rolling wheel 5-1 is driven backward, the gap between the rolling wheel 5-1 and the slope plate 5-2 becomes larger and larger, the water suction tube 2 pressed by the rolling wheel 5-1 is loosened, the cross-sectional area of the water suction tube 2 becomes larger and larger under the action of an elastic restoring force of the water suction tube 2, and the flow of the water suction tube 2 increases until it is fully opened. Under normal conditions, the rolling wheel 5-1 is disposed behind, and the water suction tube 2 is in a switch-opened state to keep a suction state. The water suction tube 2 may be gradually closed by pushing the rolling wheel 5-1 forward.

Then, an infusion soft tube of an infusion bag or infusion bottle is connected to a water intake tube outer port 1-8 of the oral-care sputum suction tube 100 of the present disclosure, and physiological saline for cleaning an oral cavity sequentially passes through the water intake tube outer port 1-8, the water intake tube 3, and the water intake opening 4-2 on the toothbrush head 4, and flows into the oral cavity to perform oral cleaning care.

During oral cleaning care, according to the size of water flow in an oral cavity and the degree of consciousness of a patient, the position of the water suction tube switch 5 is properly adjusted to control the amount of liquid in the oral cavity of the patient, and the liquid in the oral cavity is sucked out in time to prevent undesired choke to ensure safety.

Embodiment 2: Oral-Care Sputum Suction Tube of the Present Disclosure

Figure 3:
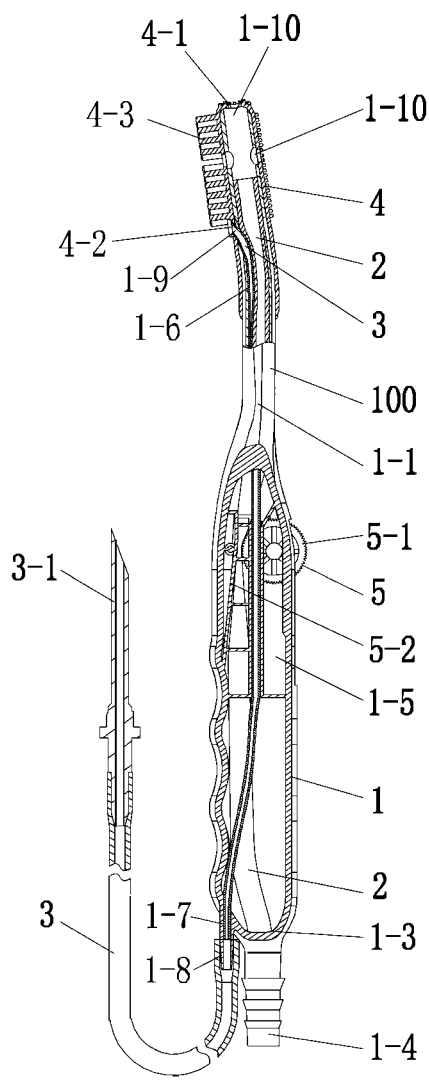
FIG. 3 is a schematic structural diagram of an oral-care sputum suction tube with a needle in a water intake tube of the present disclosure.
Figures 1, 3:
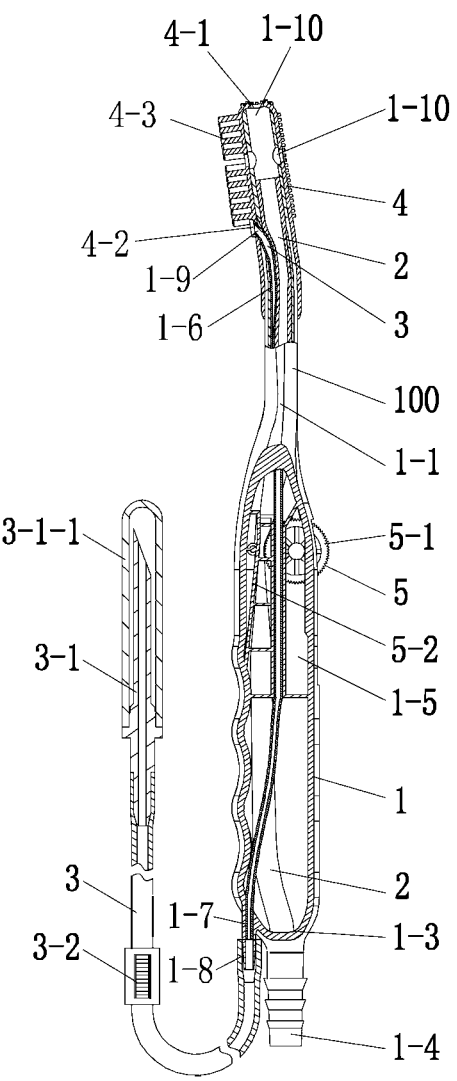

Referring to FIG. 3 to FIG. 3-1, the difference between the present embodiment and Embodiment 1 lies in that the proximal end of the water intake tube 3 is provided with a needle 3-1 capable of being connected to an infusion bag/bottle, the needle 3-1 is provided with a detachable protective sleeve 3-1-1, and a flow control switch 3-2 is provided on the water intake tube 3. In this way, medical personnel are more convenient in clinical use. It is only necessary to connect the negative pressure tube of the hospital to the water suction tube port 1-4 on the housing 1 of the oral-care sputum suction tube 100 of the present disclosure, pull up the protective sleeve 3-1-1, and insert the needle 3-1 into the infusion bag or infusion bottle, so as to perform oral cleaning and care.

In addition, the switch 5 for controlling the flow of the water suction tube may have various different specific designs, such as various rotary valve type switches, which are not enumerated here.

It should be noted that the structures disclosed and described herein may be replaced with other structures having the same effect, and the embodiments described herein are not the only structures that implement the present disclosure. Although the preferred embodiments of the present disclosure have been described and illustrated herein, it will be obvious to those skilled in the art that these embodiments are merely illustrative, and those skilled in the art can make numerous changes, improvements and replacements without departing from the present disclosure. Therefore, the scope of protection of the present disclosure should be defined in accordance with the spirit and scope of the claims appended hereto.

The invention claimed is:

1. An oral-care sputum suction tube, comprising a housing, a water suction tube, a water intake tube, a toothbrush head, and a switch capable of controlling water flow in the water suction tube, wherein:

A. the water suction tube and the water intake tube are mounted in the housing, the toothbrush head is mounted at a distal end of the housing, the switch is mounted in a switch mounting groove provided on a hand-held portion of the housing, wherein the switch comprises a rolling wheel and a slope plate, and the water suction tube is mounted between the rolling wheel and the slope plate;

B. a distal end of the water suction tube is connected to a water suction tube distal-end inner port provided at the distal end of the housing, and a distal end of the water intake tube is connected to a water intake tube distal-end inner port provided at the distal end of the housing; and C. a water suction opening provided on the toothbrush head is corresponding to a water suction opening provided on the housing, and a water intake opening provided on the toothbrush head is corresponding to a water intake opening provided on the housing.

2. The oral-care sputum suction tube according to claim 1, wherein the water suction tube is made of a medical elastic material.

3. The oral-care sputum suction tube according to claim 1, wherein a gap between the rolling wheel and the slope plate becomes smaller when the rolling wheel is driven forward and the rolling wheel presses the water suction tube to make the cross-sectional area of the water suction tube smaller, and the water flow in the water suction tube decreases until it is completely closed.

4. The oral-care sputum suction tube according to claim 3, wherein the gap between the rolling wheel and the slope plate becomes larger when the rolling wheel is driven backward and the water suction tube pressed by the rolling wheel is loosened, the cross-sectional area of the water suction tube becomes larger under an elastic restoring force of the water suction tube, and the water flow in the water suction tube increases until it is fully opened.

5. The oral-care sputum suction tube according to claim 1, wherein the toothbrush head is made of a medical elastic material.

6. The oral-care sputum suction tube according to claim 1, wherein the toothbrush head comprises at least one water suction opening and one water intake opening.

7. The oral-care sputum suction tube according to claim 1, wherein the distal end of the water suction tube is connected to the water suction tube distal-end inner port of the housing, and the proximal end of the water suction tube is connected to a water suction tube proximal-end inner port of the housing; and the distal end of the water intake tube is connected to the water intake tube distal-end inner port of the housing, and the proximal end of the water intake tube is connected to a water intake tube proximal-end inner port of the housing.

8. The oral-care sputum suction tube according to claim 1, wherein a proximal end of the water intake tube is provided with a needle capable of being connected to an infusion bag/bottle.

9. The oral-care sputum suction tube according to claim 8, wherein the needle is provided with a detachable protective sleeve.

10. The oral-care sputum suction tube according to claim 8, wherein a flow control switch is provided on the water intake tube.

\* \* \* \* \*